(12) United States Patent
Huang

(10) Patent No.: US 8,693,958 B2
(45) Date of Patent: Apr. 8, 2014

(54) MONITORING MEDIA SERVICES IN TELECOMMUNICATIONS NETWORKS

(75) Inventor: Yangcheng Huang, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 268 days.

(21) Appl. No.: 13/139,724

(22) PCT Filed: Dec. 17, 2008

(86) PCT No.: PCT/EP2008/067761
§ 371 (c)(1),
(2), (4) Date: Aug. 28, 2011

(87) PCT Pub. No.: WO2010/069372
PCT Pub. Date: Jun. 24, 2010

(65) Prior Publication Data
US 2011/0306305 A1   Dec. 15, 2011

(51) Int. Cl.
*H04B 17/00* (2006.01)
*H04W 24/00* (2009.01)

(52) U.S. Cl.
USPC ........ 455/67.11; 425/423; 425/425; 370/252; 709/223; 709/224

(58) Field of Classification Search
USPC ........ 455/67.11, 423, 425; 370/252; 709/223, 709/224
See application file for complete search history.

(56) References Cited

U.S. PATENT DOCUMENTS

| | | | |
|---|---|---|---|
| 5,799,154 A * | 8/1998 | Kuriyan | 709/223 |
| 8,135,395 B2 * | 3/2012 | Cassett et al. | 455/423 |
| 2004/0185786 A1 * | 9/2004 | Mirbaha et al. | 455/67.11 |
| 2006/0252376 A1 * | 11/2006 | Fok et al. | 455/67.13 |
| 2007/0002732 A1 * | 1/2007 | Batni et al. | 370/229 |
| 2007/0026854 A1 * | 2/2007 | Nath et al. | 455/423 |
| 2007/0217339 A1 * | 9/2007 | Zhao | 370/252 |
| 2008/0049626 A1 * | 2/2008 | Bugenhagen et al. | 370/241 |
| 2008/0069002 A1 * | 3/2008 | Savoor et al. | 370/241 |
| 2008/0095173 A1 * | 4/2008 | Bugenhagen | 370/395.21 |
| 2008/0305747 A1 * | 12/2008 | Aaron | 455/67.13 |
| 2010/0077077 A1 * | 3/2010 | Devitt | 709/224 |
| 2011/0096678 A1 * | 4/2011 | Ketonen | 370/252 |

FOREIGN PATENT DOCUMENTS

| | | |
|---|---|---|
| CN | 1716870 A | 1/2006 |
| CN | 101237687 A | 8/2008 |
| CN | 101296459 A | 10/2008 |
| EP | 1 826 987 A2 | 8/2007 |
| EP | 1 936 868 A1 | 6/2008 |

OTHER PUBLICATIONS

PCT International Search Report, mailed Aug. 10, 2009, in connection with International Application No. PCT/EP2008/067761.

(Continued)

*Primary Examiner* — Gennadiy Tsvey

(74) *Attorney, Agent, or Firm* — Potomac Patent Group PLLC

(57) ABSTRACT

A method of monitoring Quality of Experience or other indicators of quality of service delivering media data to user equipment in a telecommunications network. The method comprises determining a first value of the metric, determining a second value of the metric after a defined period of time, adjusting the value of said defined period of time, wherein the second determined value of the metric is used in determination of magnitude and direction of the adjustment and recording the determined values of the metric.

18 Claims, 5 Drawing Sheets

(56) References Cited

OTHER PUBLICATIONS

Telefonaktiebolaget AB L M Ericsson et al: "MTSI QoE Configuration and Reporting" 3GPP Draft; S4-080742 MTSI QoE Configuration and Reporting, 3rd Generation Partnership Project, Mobile Competence Centre, 650 Route des Lucioles, F-06921 Sophia-Antipolis Cedex, France, no. Shenzhen, P.R. China, Nov. 3, 2008, XP050335260.

Chinese Office Action, dated Jul. 1, 2013, in connection with counterpart Chinese Patent Application No. 200880132836.X (translation), all pages.

Chinese Search Report, dated Jun. 25, 2013, in connection with counterpart Chinese Patent Application No. 200880132836.X (translation), all pages.

\* cited by examiner

MONITORING MEDIA SERVICES IN TELECOMMUNICATIONS NETWORKS

TECHNICAL FIELD

The present invention relates to telecommunications networks, in general, and in particular to monitoring quality of media services provided to user equipment operating in the telecommunications networks.

BACKGROUND

With the advent of fast internet capable of delivering media to subscribers, whether via wired or wireless connection, this channel constantly increases and will increase further its share in services provided by telecom operators. In order to build a business based on these services the quality of the product delivered must be very good if the clients are expected to pay for it. The ultimate measure of a network and the services it offers is how subscribers perceive the performance. Quality of Experience (QoE) refers to the perception of the user about the quality of a particular service of a network. With the growth of mobile services, it has become very important for an operator to measure the QoE of its network accurately and improve it further to achieve customer loyalty and maintain competitive edge, especially for emerging services like Mobile TV.

Measuring Quality of Service (QoS, e.g. packet loss rate, end-to-end delay, etc.) may not be accurate in reflecting the user experiences. Although a better network QoS in many cases will result in better QoE, fulfilling all traffic QoS parameters will not guarantee a satisfied user. It might not be entirely accurate to infer that QoE is improved by reducing jitter or average packet delay. Correspondingly, although there have been considerable methods in QoS provisioning and network characteristic measurements, QoE measurement or estimation methods are still in great need in order to gain a clear knowledge about the user satisfaction.

SUMMARY

It is the object of the present invention to provide an improved method of monitoring various quality indicators of a service providing media data to user equipment.

According to a first aspect of the present invention there is provided a method of monitoring data indicative of quality metric of a service delivering media data to user equipment in a telecommunications network comprising determining a first value of the metric and determining a second value of the metric after a defined period of time. The determined values of the metric are recorded. The method also comprises adjusting the value of said defined period of time, wherein the second determined value of the metric is used in determination of magnitude and direction of the adjustment.

According to a second aspect of the present invention there is provided user equipment for receiving a service delivering media data from a telecommunications network. The user equipment comprising a receiving section, a processing unit and a memory is adapted to monitor data indicative of quality metric of said service. Said processing unit is adapted to determine a first value of the metric and after a defined period of time to determine a second value of the metric and to record the determined values of the metrics in the memory. The processing unit is further adapted to adjust the value of said defined period of time, wherein the second determined value of the metric is used in determination of magnitude and direction of the adjustment.

Further features of the present invention are as claimed in the dependent claims.

The present invention provides the benefit of accurate and cost-efficient measurement and reporting of the quality metrics, even if there are no persistent uplink connections during the sessions (e.g. reporting after the session is over). Further benefits include reduced overhead, including network traffic overhead, reduced CPU and memory utilization on the content servers (in processing the reports). The algorithm using adaptive measurement window (a defined period of time between two consecutive determinations) and calculating statistics reduce the size of the report, which means that there is no need for a large storage capacity at the Network Management System or somewhere else in the network to store the received reports.

BRIEF DESCRIPTION OF THE DRAWINGS

The present invention will be understood and appreciated more fully from the following detailed description taken in conjunction with the drawings in which.

DETAILED DESCRIPTION

In the description of embodiments of the present invention metrics defining Quality of Experience (QoE) are used. The present invention is not, however, limited to reporting QoE, but is also applicable to other metrics for which it is not required real time reporting.

The term processing unit used in this description includes, but is not limited to, microprocessors also referred to as CPUs (Central Processing Units also known as general purpose processors), application specific processors, for example digital signal processors (DSPs), hardware accelerators, or sets of processors with auxiliary electronic devices.

In reporting Quality of Experience it is not required to use real time monitoring. The reported QoE features are not intended for charging or real time adaptation of the service. The focus of QoE reporting is to estimate perceived quality of, for example, Mobile TV service.

A User Equipment (UE) determines (i.e. measures or calculates) the QoE metrics every X seconds. This defined period of time that separates two measurements is called a measurement window. In one embodiment the initial measurement window is set to 5 seconds.

Figure 5:
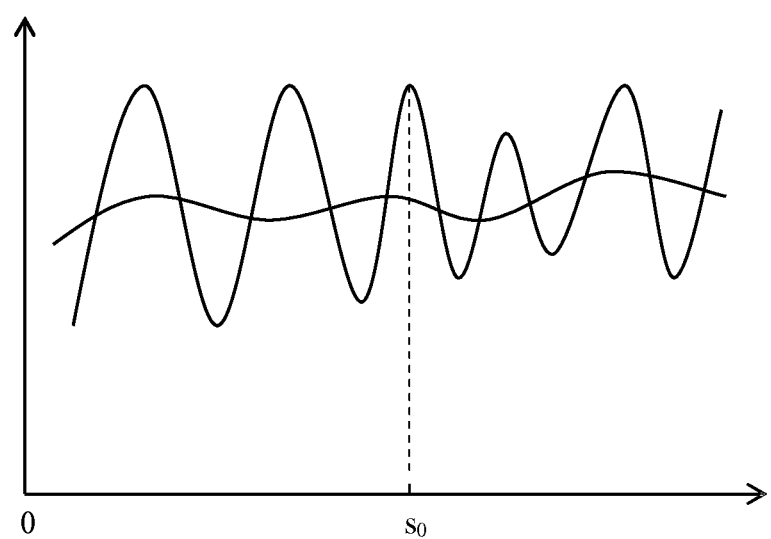
FIG. 5 shows results of measurement of two QoE metrics as a function of time.

The size of the measurement window determines the accuracy of the measured data (i.e. accuracy of the measured QoE metric). A very short measurement window gives very accurate QoE metric, but results also in very large amount of data that has to be processed and transmitted. On the other hand, transient QoE activity may not be accurately detected if the measurement window is large. For example, a burst of frame loss activity lasting only a few seconds is likely to go undetected with a measurement window of several minutes. In addition, as shown in FIG. 5 the measured results of the two curves might have equal values, but the service experience in these two cases is different.

A smaller measurement window generates more accurate results and provides better understanding of the distribution. However, as explained earlier, it leads to a larger sample size and increases network traffic overhead (in transmitting QoE reports), CPU/memory utilization both on the content servers (in processing QoE reports) and on the UEs (in calculating QoE metrics), and also requires a large storage capacity at the NMS (Network Management System) or somewhere else in the telecommunications network where the reports may be stored.

In order to optimize the measurement sample and maintain accuracy of the measurement on an acceptable level the present invention introduces dynamic adjustment of the size of the QoE measurement window after each measurement, which results in an adaptive measurement window. When frequent changes of a QoE metric are detected, a shorter measurement window is used to measure the user experience with greater accuracy. When fewer fluctuations of the QoE metrics are detected, the measurement window is increased in order to reduce the overhead introduced by QoE reporting.

Figure 1:
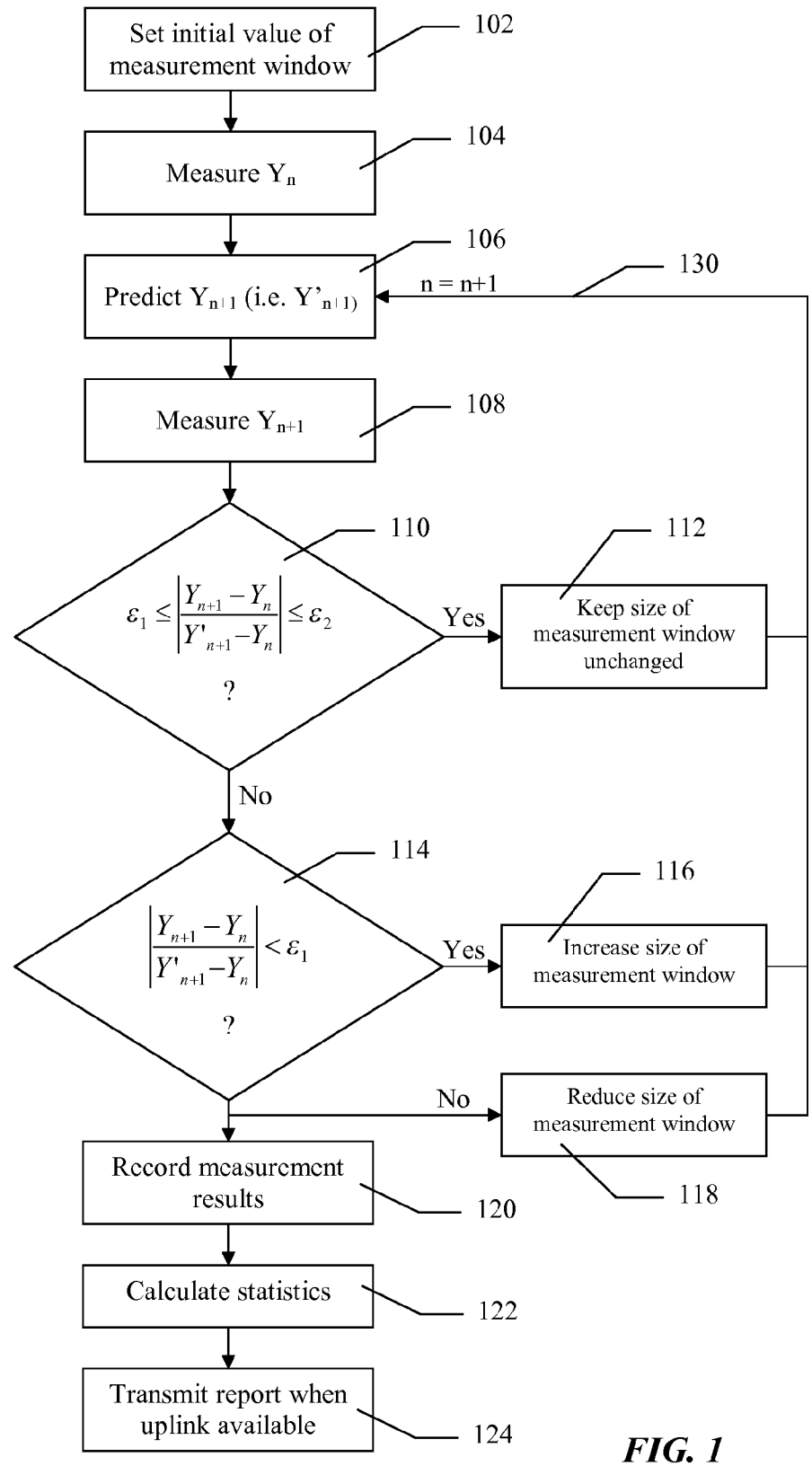
FIG. 1 is a flow chart illustrating a method of monitoring data indicative of quality metric in one embodiment of the present invention.

One embodiment of the method of the present invention is discussed below. In this embodiment the value of the specific QoE metric is predicted before it is measured and the accuracy of the prediction is also taken into account when deciding on increase or reduction of the measurement window. This embodiment is illustrated in FIG. 1.

Let $S=\{S_1, S_2, \ldots S_n\}$ be the size of the measurement window, and let $S_n$ be the current size of measurement window for a specific QoE metric. In one embodiment, mobile TV frame erasure ratio or frame loss is measured after expiry of time period $S_n$ from the previous measurement.

Let $Y=\{Y_1, Y_2, \ldots Y_n\}$ be the results of the QoE measurements, and let $Y_n$ be the most recently measured QoE result 104.

Let $Y'_{n+1}$ be the predicted QoE result after the time period $S_n$ 106.

Let $Y_{n+1}$ be the actual measured QoE result after the time period $S_n$ 108.

Finally, let $C_n$ be the sum of the QoE change rate during each measurement window.

Below it is explained how the size of the measurement window after the time period $S_n$ is determined (i.e. the value of the next measurement window $S_{n+1}$).

When the method is started the size of the measurement window is initially set, 102, to some arbitrary value, for example 5s.

Each time, after measurement of the QoE metric is carried out and a result value $Y_n$ is known, the prediction of the next measurement result, e.g. $Y'_{n+1}$, is made based on the previous measurement results (e.g. $Y=\{Y_1, Y_2, \ldots Y_n\}$) and the current size of measurement window $S_n$. The method of calculating $Y'_{n+1}$ is as follows:

$$C_n = \sum_{i=1}^{n-1} \frac{Y_{n+1} - Y_n}{S_{i+1}} \quad (1)$$

$$Y'_{n+1} = Y_n + S_n * \frac{C_n}{n-1} \quad (2)$$

Equation (2) gives the predicted second value of the metric, which is a sum of the first determined value of the metric and a product of average change rate (i.e.

$$\left(\text{i.e. } \frac{C_n}{n-1}\right)$$

and the measurement window $S_n$.

The actual next value of the QoE metric, $Y_{n+1}$, is measured, 108, after the time period $S_n$.

With both values of the QoE metric known (i.e. predicted and measured) it is possible to check how good was the prediction and how stable or unstable is the QoE metric. If the measured QoE change (i.e. $|Y_{n+1}-Y_n|$) is approximately equal to the predicted QoE change (i.e. $|Y'_{n+1}-Y_n|$), the prediction is accurate, and the size of the measurement window is kept unchanged. A formula that can be used to automatically check the accuracy of prediction and decide on the size of the measurement window is as follows:
if $$\varepsilon_1 \le \left|\frac{Y_{n+1} - Y_n}{Y'_{n+1} - Y_n}\right| \le \varepsilon_2,$$

then $S_{n+1}=S_n$, where $0<\epsilon_1<1<\epsilon_2$; $\epsilon_1\epsilon_2$ are manually configured. This is illustrated in steps 110 and 112 of FIG. 1.

If the absolute measured QoE change (i.e. $|Y_{n+1}-Y_n|$) is much smaller than the predicted QoE change (i.e. $|Y'_{n+1}-Y_n|$), it indicates the quality of user experience has few changes (the QoE metric is stable). In this situation the size of the measurement window is therefore increased. In one embodiment the increase is by 1 s. This condition is checked as follows:
if $$\left|\frac{Y_{n+1} - Y_n}{Y'_{n+1} - Y_n}\right| < \varepsilon_1,$$

then $S_{n+1}=S_n+1$ and this is illustrated in steps 114 and 116 of FIG. 1.

If the measured QoE change (i.e. $|Y_{n+1}-Y_n|$) is much larger than the predicted QoE change (i.e. $|Y'_{n+1}-Y_n|$), it indicates a change in the quality of user experience (the QoE metric is unstable). In this situation the size of the measurement window is therefore reduced to improve the accuracy of the QoE measurements. This condition is checked as follows:
if $$\left|\frac{Y_{n+1} - Y_n}{Y'_{n+1} - Y_n}\right| > \varepsilon_2, \text{ then } S_{n+1} = \frac{S_n}{\left|\frac{Y_{n+1} - Y_n}{Y'_{n+1} - Y_n}\right|}$$

and this is illustrated in steps 110, 114 and 118 of FIG. 1.

The formulae for calculating the reduced size of the measurement window $S_{n+1}$ given above is an example only and other formulae are possible.

After the adjustment of the measurement window the method goes to the step of predicting the next value of the QoE metric $Y'_{n+2}$. This is illustrated in FIG. 1 by line 130.

All the measured values of the QoE metric are recorded 120 in a memory of user equipment (e.g. mobile phone) or in auxiliary memory unit and are used in the prediction algorithm as well as in reporting of data indicative of the QoE metric to a network management system or to a provider of the service which is monitored.

In one embodiment, in addition to recording of the measured values of the QoE metric, a time-stamp indicating the time of the measurement is also recorded. This allows for time correlation of various metrics controlled in the same UE or in several UEs receiving the service (especially if these UEs are in the same part of the network, e.g. the same cell).

The prediction algorithm as illustrated by formulae (1) and (2) above is only one possible example of a very simple prediction algorithm and in alternative embodiments different prediction algorithms can be used.

In one embodiment the decision on modifying the length of the measurement window is taken without prediction algorithm and only based on the changes of the value of the QoE metric.

Figure 2:
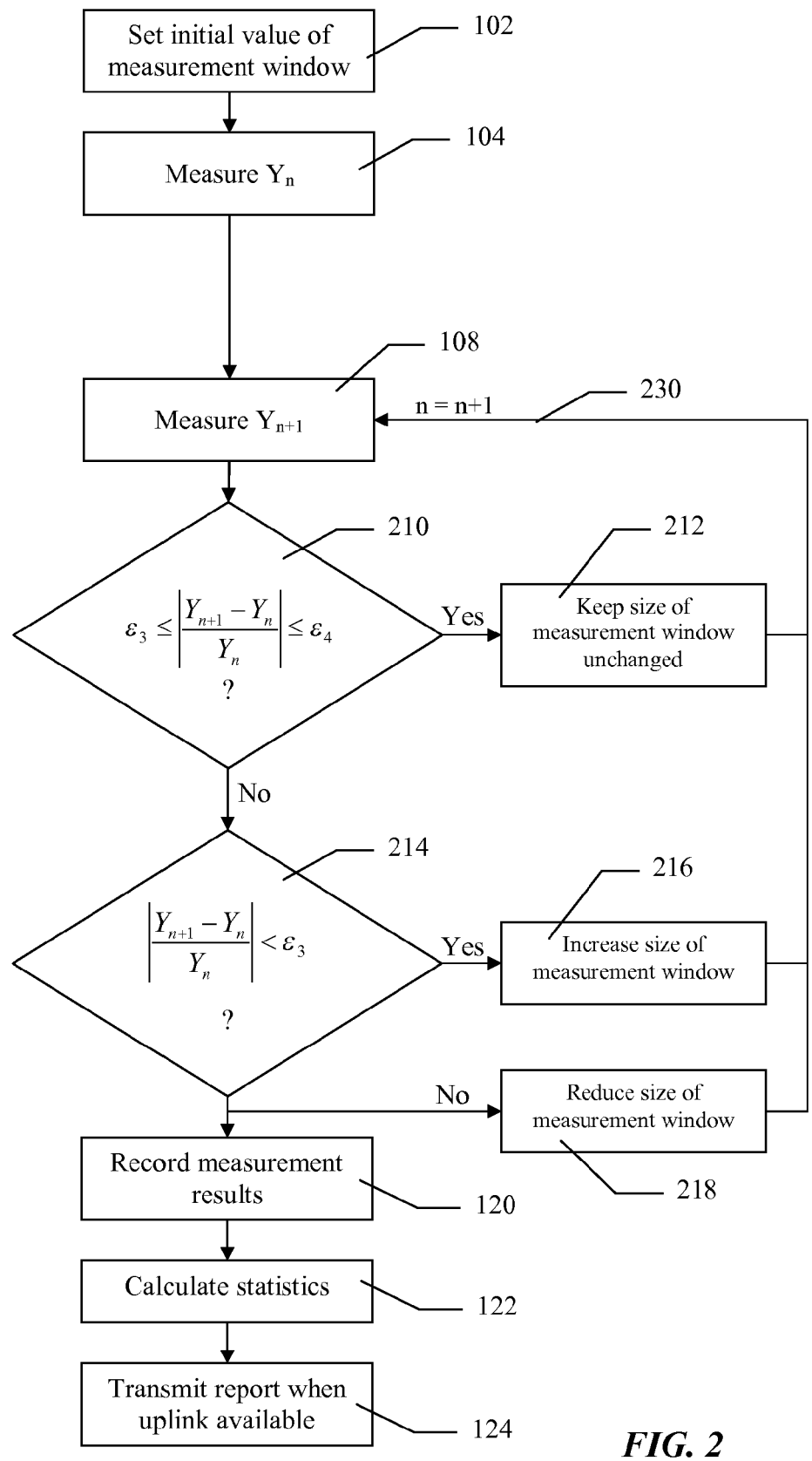
FIG. 2 is a flow chart illustrating a method of monitoring data indicative of quality metric in alternative embodiment of the present invention.

This embodiment is illustrated in FIG. 2. The difference between embodiment illustrated in FIG. 2 and the one shown in FIG. 1 is that there is no prediction of the value of QoE metrics and the steps that check in which direction the measurement window should be adjusted are based on change of value of the QoE metric between two consecutive measurements.

With two measured values of QoE metric known it is possible to check how stable or unstable is the QoE metric. If the change of the measured QoE metric (i.e. $|Y_{n+1}-Y_n|$) is low it indicates that QoE metric is stable and the size of the measurement window is kept unchanged. A formula that can be used to automatically decide on the size of the measurement window is as follows:

if $$\varepsilon_3 \le \left|\frac{Y_{n+1} - Y_n}{Y_n}\right| \le \varepsilon_4,$$

then $S_{n+1}=S_n$, where $\varepsilon_3$ and $\varepsilon_4$ are manually configured arbitrary values. This is illustrated in steps 210 and 212 of FIG. 2.

If the measured QoE change (i.e. $|Y_{n+1}-Y_n|$) is very low (i.e. below the lower limit of the check previously discussed) it indicates the quality metric is stable. In this situation the size of the measurement window is therefore increased. In one embodiment the increase is by 1 s. This condition is checked as follows:

if $$\left|\frac{Y_{n+} - Y_n}{Y_n}\right| < \varepsilon_3,$$

then $S_{n+1}=S_n+1$ and this is illustrated in steps 214 and 216 of FIG. 2.

If the measured QoE change (i.e. $|Y_{n+1}-Y_n|$) is larger than the upper limit $\varepsilon_4$, it indicates an unstable QoE metric. In this situation the size of the measurement window is therefore reduced to improve the accuracy of the QoE measurements. This condition is checked as follows:

if $$\left|\frac{Y_{n+1} - Y_n}{Y_n}\right| > \varepsilon_4, \text{ then } S_{n+1} = \frac{S_n}{\left|\frac{Y_{n+1} - Y_n}{Y_n}\right|}$$

and this is illustrated in steps 210, 214 and 218 of FIG. 2.

The formulae for calculating the reduced size of the measurement window $S_{n+1}$ given above is an example only and other formulae are possible.

After the adjustment of the measurement window the method goes to the step of determining (measuring or calculating) the next value of the QoE metric $Y_{n+2}$. This is illustrated in FIG. 2 by line 230.

In yet another embodiment the decision on modifying the length of the measurement window is taken only based on the accuracy of prediction of the value of the QoE metric.

Figure 3:
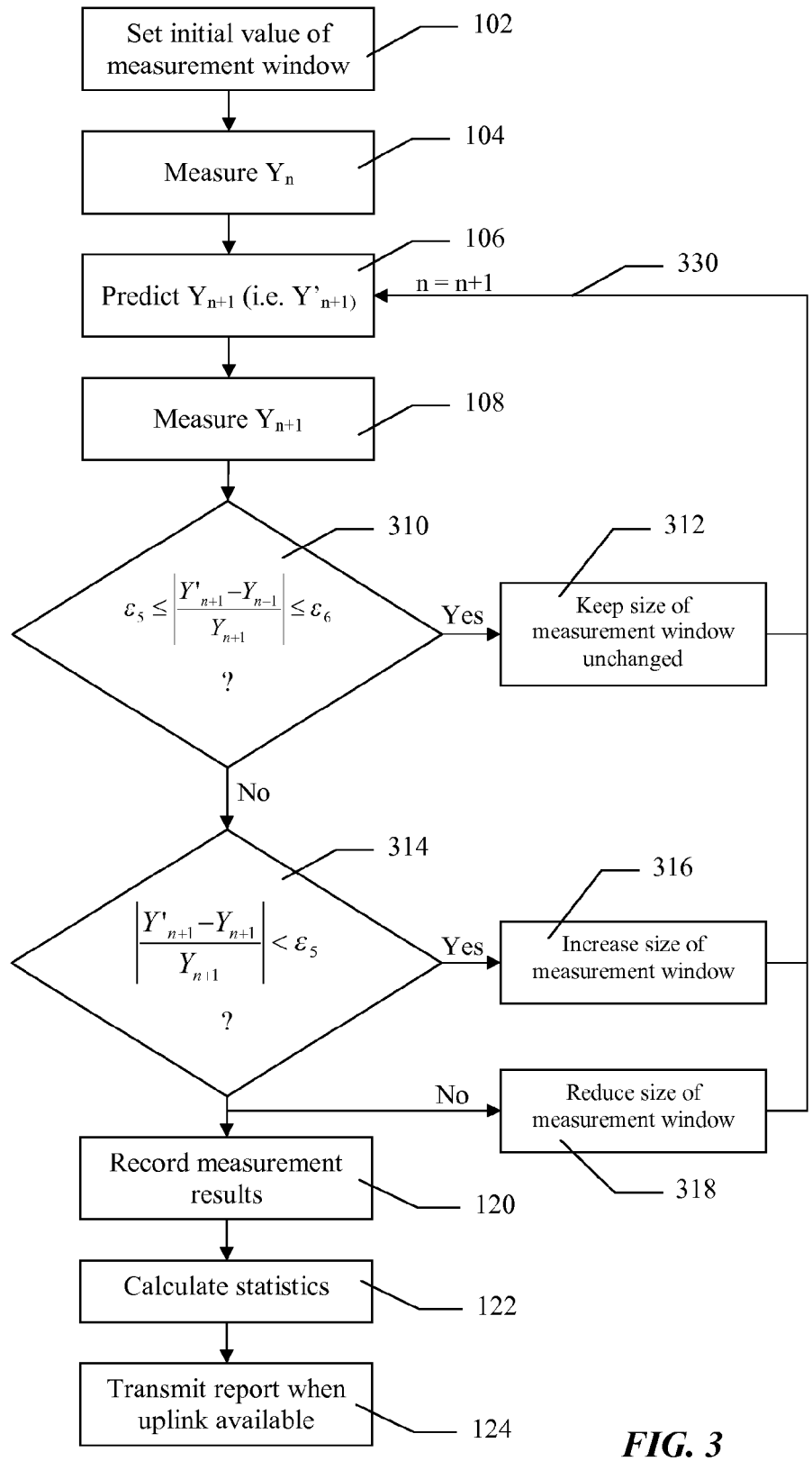
FIG. 3 is a flow chart illustrating a method of monitoring data indicative of quality metric in alternative embodiment of the present invention.

This embodiment is illustrated in FIG. 3. The difference between embodiment illustrated in FIG. 3 and the one shown in FIG. 1 is that the steps that check in which direction the measurement window should be adjusted are based only on accuracy of prediction of the value of the QoE metric.

With both values of the QoE metric known (i.e. predicted and measured) it is possible to check how good was the prediction. If the absolute difference between the measured QoE metric and the predicted one (i.e. $|Y'_{n+1}-Y_{n+1}|$) is low it indicates that the prediction is accurate, and the size of the measurement window is kept unchanged. A formula that can be used to automatically decide on the size of the measurement window is as follows:

if $$\varepsilon_5 \le \left|\frac{Y'_{n+1} - Y_{n+1}}{Y_{n+1}}\right| \le \varepsilon_6$$

then $S_{n+1}=S_n$, where $\varepsilon_5$ and $\varepsilon_6$ are manually configured arbitrary values. This is illustrated in steps 310 and 312 of FIG. 3.

If the accuracy of prediction of QoE metric (i.e. $|Y'_{n+1}-Y_{n+1}|$) is very good (i.e. below the lower limit $\varepsilon_5$) the size of the measurement window is therefore increased. In one embodiment the increase is by 1 s. This condition is checked as follows:

if $$\left|\frac{Y'_{n+1} - Y_{n+1}}{Y_{n+1}}\right| \le \varepsilon_5,$$

then $S_{n+1}=S_n+1$ and this is illustrated in steps 314 and 316 of FIG. 3.

If the accuracy of prediction of QoE metric (i.e. $|Y'_{n+1}-Y_{n+1}|$) is not good (i.e. large difference between prediction and measured value) the size of the measurement window is reduced to improve the accuracy of the QoE measurements. This condition is checked as follows:

if $$\left|\frac{Y'_{n+1} - Y_{n+1}}{Y_{n+1}}\right| > \varepsilon_6, \text{ then } S_{n+1} = \frac{S_n}{\left|\frac{Y'_{n+1} - Y_{n+1}}{Y_{n+1}}\right|}$$

and this is illustrated in steps 310, 314 and 318 of FIG. 3.

The formulae for calculating the reduced size of the measurement window $S_{n+1}$ given above is an example only and other formulae are possible.

After the adjustment of the measurement window the method goes to the step of predicting the next value of the QoE metric $Y'_{n+2}$. This is illustrated in FIG. 3 by line 330.

Once the QoE metrics are collected and recorded at a frequency defined by the adaptive measurement window they have to be delivered to the telecommunications network (network management system or provider of the monitored service).

In a simplest embodiment the determined and recorded data are transmitted and the transmission is initiated when an uplink channel connection is available to said user equipment. In an alternative embodiment, in addition to the values of the QoE metrics, also the time-stamp data are transmitted to the telecommunications network for use in analysing the QoE data.

In yet another embodiment of the present invention the amount of data related to QoE metrics transmitted by the user equipment to the network is reduced by processing, 122, the data in the user equipment and transmitting only results of this processing. The processing is for example calculating statistics, 122, of the recorded values of the QoE metric and transmitting a report 124 comprising the calculated statistics. The transmission is initiated when an uplink channel connection is available to the user equipment.

Using the method implementing the adaptive measurement window the following set of measurement results of QoE metric were obtained:

$R = \{(S_1, Y_1), (S_2, Y_2), \ldots, (S_k, Y_k)\}$, where $S_i$ is the measurement window of the result $R_i (1 \le i \le k)$, while $Y_i$ is the value of the measured QoE metric.

Instead of sending these results directly to the content servers, the present invention in one of its embodiments calculates a Probability Density Function (PDF) of the measured values of QoE metrics. The steps of calculation of the Probability Density Function are explained below:

(1) Select from the measured QoE results $Y_{min}$ (i.e. the minimum value of the metric) and $Y_{max}$ (i.e. the maximum value of the metric).

(2) Calculate $R = \{(S_1, Y''_1), \ldots (S_k, Y''_2), \ldots (S_k, Y''_k), \}$, $$Y''_i = \frac{Y_i}{Y_{max}} * 100$$

(i.e. percentage of $Y_{max}$).

(3) Given the size limit of the report L, the reporting interval is:

$$\Delta_Y = \frac{\left(1 - \frac{Y_{min}}{Y_{max}}\right) \times 100}{L};$$

The reporting interval is a characteristics of a probability density function, which shows a discrete distribution of probability of a variable taking a value falling within one of several reporting intervals. The more reporting intervals (or the shorter they are) the distribution is closer to a continuous distribution. If the probability density function is to be reported and there is a limit on the size of the report the allowed size of the report determines the number of reporting intervals and in consequence their length.

And if there is no size limit the reporting interval is:

$$\Delta_Y = 1, L = \frac{Y_{max} - Y_{min}}{Y_{max}} \times 100.$$

(4) Calculate the time period during which the measured QoE is between $$\left(\frac{Y_{min}}{Y_{max}} \times 100 + (i-1) \times \Delta_Y, \frac{Y_{min}}{Y_{max}} \times 100 + i \times \Delta_Y\right)(1 \le i \le L)$$

for (i=1; i<=L; i++)
for each $(S_j, Y''_j) \in R$
if $$\left(\frac{Y_{min}}{Y_{max}} \times 100 + (i-1) \times \Delta_Y\right) \le Y''_j < \left(\frac{Y_{min}}{Y_{max}} \times 100 + i \times \Delta_Y\right)$$

$P_i += S_j$ $P_i$ is the time period during which the measured QoE metric is within the defined above range and in practice it is a sum of values of measurement windows (i.e. time) during which the metric was within said range.

Finally, the QoE report sent by the user equipment includes $Y_{min}, Y_{max}$ and $P = \{P_1, P_2 \ldots P_L\}$.

In operation the calculation of the probability density function can be carried out as in the simple example given below.

Let's assume $Y_{max} = 1$ (determined frame loss ratio), i.e. 100% of the packets are lost: $R = \{(S_1, Y''_1), (S_2, Y''_2), \ldots (S_k, Y''_k), \} = \{(3, 0.4), (5, 1), (1, 0.9), (2, 0.4), (3, 0.5)\}$ (Note that these data is only used to explain the statistics calculation method, and to simplify the explanation they don't reflect the adaptive measurement window algorithm explained earlier in the application.)

From R one can see that there are 3 seconds that 40% of the packets are lost; 5 seconds that 100% of the packets are lost, 1 second that 90% of the packets are lost, etc.

Using the proposed method, it is possible to calculate how long is the time period during which the measured metrics is 0.4?

From the example data one can see that this period is 5s, i.e. (3, 0.4) and (2, 0.4).

Therefore, the following result is obtained $\{(0.4, 5), (0.5, 3), (0.9, 1), (1, 5)\}$, where in the first position in each pair is the value of the metric and in the second position is the summarised time the metric was at this value. The time here is a measure of probability.

If the measurement sample is large (for example there are 400-1000 data points), the report would be large too. Although Y" is a percentage between 0 and 1, it is still possible that it is something like 0.123432423, 0.154253452, 0.234234343, 0.24355345, which would produce a large report. So to report such measurement results, the results are rounded. For example, 0.123432423, 0.154253452, 0.234234343, 0.24355345 are rounded to 0.12, 0.15, 0.23, 0.24. When multiplied by 100 at most 101 data points from 0 to 100 are produced because after rounding some results will be repeated. The report will comprise a summary duration value of 12% frame loss in its $12^{th}$ byte, a summary duration value of 50% frame loss in its $50^{th}$ byte and so on.

If there are only 20 bytes available, it is necessary to reduce the data size further. Therefore the corresponding summary duration is a sum of values of measurement windows during which the frame loss is between 0% and 5% (5%-10%, 10%-15%, 15%-20%, . . . 95%-100%)

Figure 6:
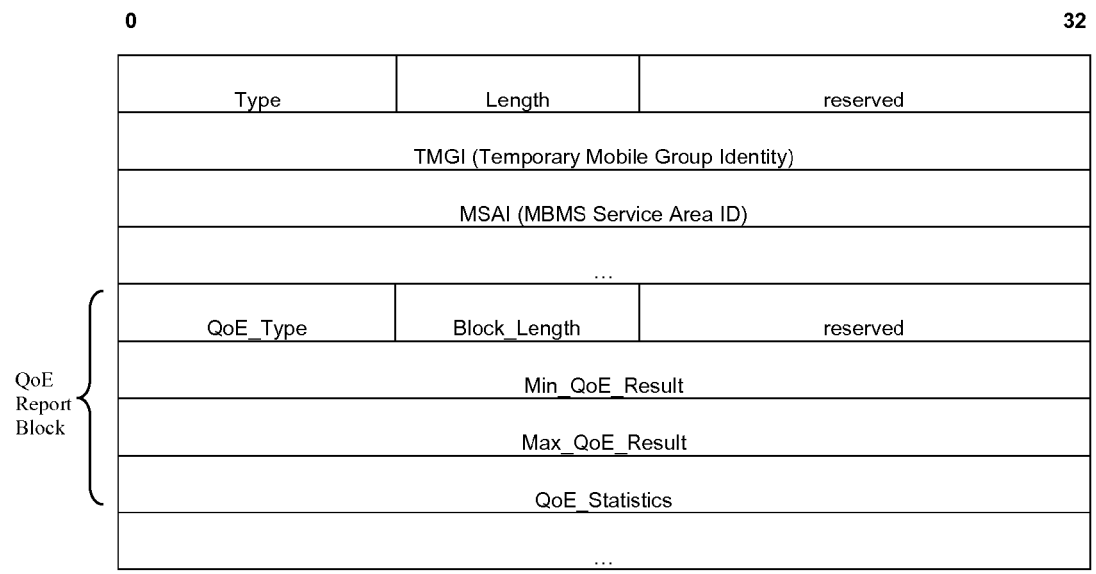
FIG. 6 illustrates a structure of a packet of RTCP protocol for transmitting a report in accordance with one embodiment of the present invention.

One of the feasible implementation methods is through RTCP QoE Reporting Extension as illustrated in FIG. 6. Receiver Report (RR) packets of RTCP protocol have a special field for profile-specific extensions. The field contains additional information that needs to be reported regularly about the sender or receivers. Using this field to extend RR functionalities has more benefits than defining a new RTCP packet, because it requires less overhead (fewer octets in the packet—no RTCP header or SSRC field) and it allows for simpler and faster parsing because applications running under that profile would be programmed to always expect the extension fields in the directly accessible location after the reception reports.

In one embodiment the statistic is reported, but it is also possible that in addition to that, if requested by the network or the service provider the full set of measured values of the monitored QoE metric is also transmitted to the provider of the media service or, in one embodiment, to the service management/monitoring systems that generate the service quality reports for mobile TV services.

Figure 4:
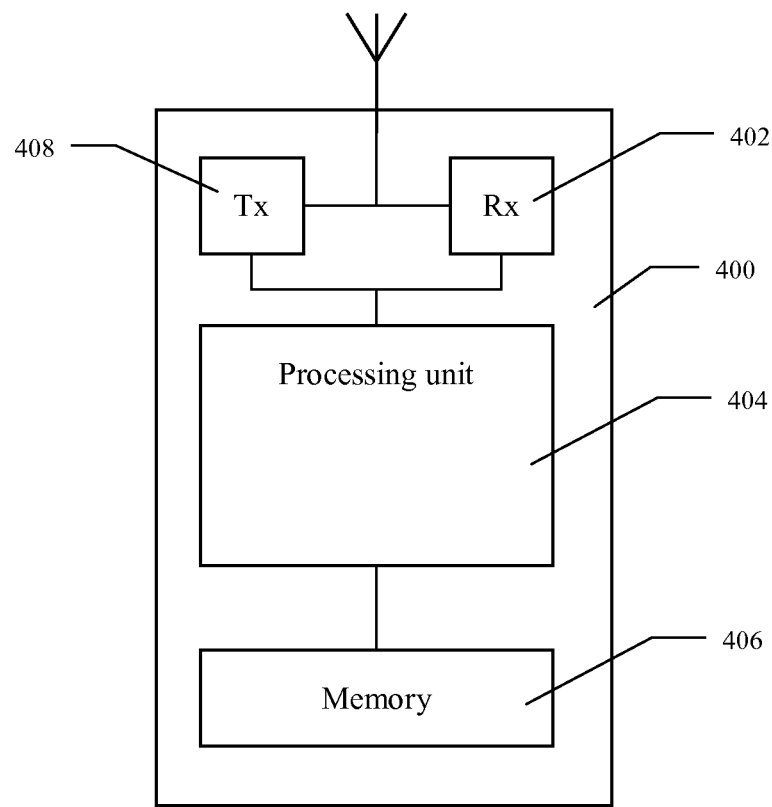
FIG. 4 is a diagram illustrating user equipment in one embodiment of the present invention.

With reference to FIG. 4 a one embodiment of user equipment 400 in accordance with the present invention is presented. The UE 400 is for receiving a service delivering media data from a telecommunications network and comprises a receiving section 402, a processor 404 and a memory 406. In the case of receiving video broadcast the processor 404 monitors frame loss rate or other metric indicative of Quality of Experience. In monitoring the or other QoE metric the process 404 determines (measures) a first value of the metric and after expiry of a measurement window measures a second value of the metric. The measured values are recorded in the memory 406. The processor 404 carries out an analysis of the measured values and depending on how the measured values change over time it adjusts the length of the measurement window. The magnitude and direction of the adjustment is a function of the second measured value.

In one embodiment the adjustment applied by the processor depends on a change of the value of the metric between the second and first measurement.

In an alternative embodiment the adjustment is a function of a difference between the second value of the measured metric and a predicted value of said metric. In this way it is checked how accurate is the prediction and the better is the prediction, the longer the measurement window can be.

In yet another alternative embodiment the adjustment is a function depending on a accuracy of prediction of values of the measured QoE metric and a dynamics of the metric (i.e. a change of the metric between the first and second determinations).

Details of how the magnitude and direction of the adjustment are determined are discussed in description of the embodiments of the method and illustrated in FIGS. 1-3, and are applicable to the operation of the user equipment 400.

The user equipment also comprises a transmitter section 408 for transmitting reports on the QoE meters. The report in one embodiment comprises the measured values of the metrics and, preferably, time-stamp information that in one embodiment is also recorded in the memory to indicate time when the measurements were taken.

In a preferred embodiment the user equipment transmits via the transmitter section a report comprising statistics calculated for the measured QoE metrics, preferably probability density function.

The transmitter section 408 transmits the report when an uplink channel is available to the user equipment 400. In a preferred embodiment the transmitter section 408 uses Real-time Transport Control Protocol (RTCP) for transmitting the report and one embodiment of a RTCP packet used for delivering such report is shown in FIG. 6. Alternative protocols can also be used for delivering said reports.

The present invention is especially applicable to reporting QoE metrics in telecommunications networks providing service based on broadcasting or multicasting of media data to user equipment and the user equipment uses the uplink channel for interaction between the user and the service. One example of this type of service is Multimedia Broadcast Multicast Service (MBMS) in wireless telecommunications networks.

The invention claimed is:

1. A method of monitoring data indicative of quality metric of a service delivering media data to user equipment in a telecommunications network, the method comprising:
    determining a first value of the metric;
    predicting a second value of the metric;
    determining a second value of the metric after a defined period of time;
    adjusting the value of said defined period of time depending on a value indicative of a difference between the second predicted value and the second determined value of the metric; and
    recording the determined values of the metric.

2. The method according to claim 1 comprising recording time-stamps for the determined values of the metric.

3. The method according to claim 1 comprising adjusting the value of said defined period of time depending on a value indicative of a change of the metric between the first and second determinations.

4. The method according to claim 1 comprising:
    predicting a second value of the metric; and
    adjusting the value of said defined period of time depending on a value indicative of a difference between the second predicted value and the second determined value of the metric and a change of the metric between the first and second determinations.

5. The method according to claim 1 comprising:
    calculating statistics of the determined metric values; and
    transmitting a report comprising the calculated statistics, wherein the transmission is initiated when an uplink channel connection is available to said user equipment.

6. The method according to claim 5, wherein said statistics of the determined metric is a probability density function calculated based on the determined metric values.

7. The method according to claim 1, wherein the step of predicting comprises determining an average change rate of the determined metric based on the recorded data, wherein the predicted second value of the metric is a sum of the first determined value of the metric and a product of said average change rate and said defined period of time.

8. The method according to claim 1, comprising a step of predicting carried out after each step of determining a value of the metric.

9. The method according to claim 1, wherein in said service the network provides broadcast or multicast of the media data to user equipment and the user equipment uses the uplink channel for interaction between the user and the service.

10. A user equipment for receiving a service delivering media data from a telecommunications network, the user equipment comprising:
    a receiving section;
    a processing unit; and
    a memory, wherein the user equipment is adapted to monitor data indicative of quality metric of said service, wherein said processing unit is adapted to determine a first value of the metric and predict a second value of the metric, and after a defined period of time to determine a second value of the metric and to record the determined values of the metrics in the memory;

the processing unit is further adapted to adjust the value of said defined period of time depending on a value indicative of a difference between the second predicted value and the second determined value of the metric.

11. The user equipment according to claim 10, wherein said processing unit is adapted to record time-stamps for the determined values of the metric in said memory.

12. The user equipment according to claim 10, wherein the processing unit is adapted to adjust the value of said defined period of time depending on a value indicative of a change of the metric between the first and second determinations.

13. The user equipment according to claim 10, wherein the processing unit is adapted to predict a second value of the metric and to adjust the value of said defined period of time depending on a value indicative of a difference between the second predicted value and the second determined value of the metric and a change of the metric between the first and second determinations.

14. The user equipment according to claim 10 comprising a transmitter section, wherein the processing unit is adapted to calculate statistics of the determined metric values and the transmitter section is adapted to transmit a report comprising the calculated statistics, wherein the transmission is initiated when an uplink channel connection is available to said user equipment.

15. The user equipment according to claim 14, wherein the user equipment is adapted to transmit the report using Real-time Transport Control Protocol.

16. The user equipment according to claim 10, wherein the data indicative of quality metric comprises data indicative of frame loss.

17. The user equipment according to claim 10, comprising a transmitter section adapted to transmit a report comprising the recorded values of the metric, wherein the transmission is initiated when an uplink channel connection is available to said user equipment.

18. The user equipment according to claim 17, wherein the transmitter section is adapted to transmit the time-stamps for the determined values of the metric.

* * * * *

UNITED STATES PATENT AND TRADEMARK OFFICE
CERTIFICATE OF CORRECTION

PATENT NO. : 8,693,958 B2
APPLICATION NO. : 13/139724
DATED : April 8, 2014
INVENTOR(S) : Huang Page 1 of 2

It is certified that error appears in the above-identified patent and that said Letters Patent is hereby corrected as shown below:

On the Title Page, in the Figure, for Tag "106", in Line 1, delete "$Y_{n+1}$ (i.e. $Y'_{n-1}$)" and insert -- $Y_{n+1}$ (i.e. $Y'_{n+1}$) --, therefor.

In the Drawings

In Fig. 1, Sheet 1 of 5, for Tag "106", in Line 1, delete "$Y_{n|1}$ (i.e. $Y'_{n|1}$)" and insert -- $Y_{n+1}$ (i.e. $Y'_{n+1}$) --, therefor.

In Fig. 3, Sheet 3 of 5, for Tag "106", in Line 1, delete "$Y_{n+1}$ (i.e. $Y'_{n+1}$)" and insert -- $Y_{n+1}$ (i.e. $Y'_{n+1}$) --, therefor.

In Fig. 3, Sheet 3 of 5, for Tag "314", in Line 1, delete "$\left|\frac{Y'_{n+1}-Y_{n+1}}{Y_{n+1}}\right|<\varepsilon_5$" and insert -- $\left|\frac{Y'_{n+1}-Y_{n+1}}{Y_{n+1}}\right|<\varepsilon_5$ --, therefor.

In the Specification

In Column 4, Line 3, delete "rate (i.e." and insert -- rate --, therefor.

In Column 5, Lines 55-56, delete "$\left|\frac{Y_{n+}-Y_n}{Y_n}\right|<\varepsilon_3,$" and insert -- $\left|\frac{Y_{n+1}-Y_n}{Y_n}\right|<\varepsilon_3,$ --, therefor.

Signed and Sealed this
Tenth Day of March, 2015

Michelle K. Lee
*Deputy Director of the United States Patent and Trademark Office*

CERTIFICATE OF CORRECTION (continued)

U.S. Pat. No. 8,693,958 B2

In Column 6, Lines 49-50, delete "$\left|\frac{Y''_{n+1} - Y_{n+1}}{Y_{n+1}}\right| \leq \varepsilon_5,$" and insert -- $\left|\frac{Y'_{n+1} - Y_{n+1}}{Y_{n+1}}\right| < \varepsilon_5,$ --, therefor.

In Column 9, Line 2, delete "95%-100%)" and insert -- 95%-100%). --, therefor.

In Column 9, Line 48, delete "a accuracy" and insert -- an accuracy --, therefor.